United States Patent
Obata et al.

(10) Patent No.: US 8,315,596 B2
(45) Date of Patent: Nov. 20, 2012

(54) TRANSMISSION PROCESS RESTRICTION METHOD, MOBILE COMMUNICATION SYSTEM, AND MOBILE STATION

(75) Inventors: Kazunori Obata, Yokosuka (JP); Kazuya Nomura, Yokohama (JP); Mikio Iwamura, Yokohama (JP); Yasuhiro Kato, Yokosuka (JP); Akihiro Maebara, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 107 days.

(21) Appl. No.: 12/739,550

(22) PCT Filed: Oct. 23, 2008

(86) PCT No.: PCT/JP2008/069217
§ 371 (c)(1),
(2), (4) Date: Jun. 15, 2010

(87) PCT Pub. No.: WO2009/054447
PCT Pub. Date: Apr. 30, 2009

(65) Prior Publication Data
US 2010/0273496 A1   Oct. 28, 2010

(30) Foreign Application Priority Data
Oct. 24, 2007   (JP) .................................. 2007-276776

(51) Int. Cl.
*H04M 1/66* (2006.01)
(52) U.S. Cl. ...................... 455/410; 455/414.1; 455/453; 370/229; 370/231; 370/232

(58) Field of Classification Search .................. None
See application file for complete search history.

(56) References Cited

U.S. PATENT DOCUMENTS
2007/0081487 A1   4/2007   Akinaga et al.

FOREIGN PATENT DOCUMENTS
| CN | 1946204 | 4/2007 |
| JP | 11 17607 | 1/1999 |
| JP | 2001 78260 | 3/2001 |
| JP | 2006 345406 | 12/2006 |
| JP | 2007 104587 | 4/2007 |

OTHER PUBLICATIONS

Office Action issued Jun. 7, 2012, in Chinese Patent Application No. 200880113009.6, filed Oct. 23, 2008 (with English-language Translation), 16 pages.

*Primary Examiner* — Wayne Cai
(74) *Attorney, Agent, or Firm* — Oblon, Spivak, McClelland, Maier & Neustadt, L.L.P.

(57) ABSTRACT

A transmission process restriction method according to the present invention includes the steps of transmitting a notification information notifying of a restriction rate for each access class and a restriction rate for each traffic class, causing the mobile station to determine a restriction rate of the mobile station on the basis of the notification information received by the mobile station, an access class of the mobile station, and a traffic class of the mobile station, causing the mobile station to compare a random number generated by the mobile station to the restriction rate of the mobile station, and causing the mobile station to decide whether or not to block the connection request transmission processing in accordance with a result of the comparison.

7 Claims, 5 Drawing Sheets

BACKGROUND ART

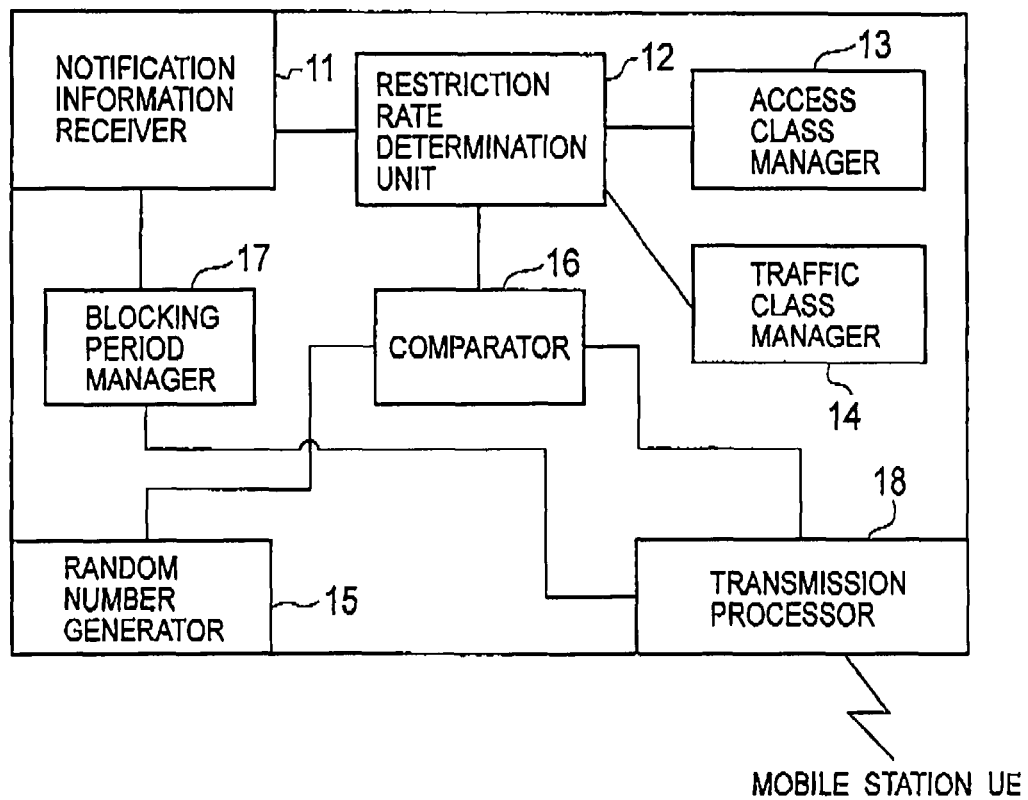

FIG. 4

|       | TC-A | TC-B | TC-C |
|-------|------|------|------|
| AC-A  | 80%  | 80%  | 0%   |
| AC-B  | 0%   |      |      |
| AC-C  | 0%   |      |      |

| AC-A | 80% |
|------|-----|
| AC-B | 0%  |
| AC-C | 0%  |

(b)

| TC-A | 80% |
|------|-----|
| TC-B | 30% |
| TC-C | 30% |

FIG. 6

0~9: NORMAL MOBILE STATION
10: PRIORITIZED MOBILE STATION (FOR Emergency Call)
11: PRIORITIZED MOBILE STATION (ForPLMN (Public Land Mobile Netowork) USE)
12: PRIORITIZED MOBILE STATION (Security Services)
13: PRIORITIZED MOBILE STATION (Public Utilities (e.g. water/gas suppliers))
14: PRIORITIZED MOBILE STATION (Emergency Service)
15: PRIORITIZED MOBILE STATION (PLMN (Public Land Mobile Netowork) Stuff (FOR MAINTENANCE MOBILE STATION))

| CONNECTION DESTINATION A | TC-A |
|---|---|
| CONNECTION DESTINATION B | TC-A |
| CONNECTION DESTINATION C | TC-B |
| CONNECTION DESTINATIONS EXCEPT ABOVE | TC-C |

(b)

| VOICE COMMUNICATION | TC-A |
|---|---|
| PACKET COMMUNICATION | TC-B |
| VIDEOPHONE | TC-A |
| OTHERS | TC-C |

(c)

| Conversational | TC-A |
|---|---|
| Streaming | TC-B |
| Interactive | TC-C |
| Back ground | TC-C |

TRANSMISSION PROCESS RESTRICTION METHOD, MOBILE COMMUNICATION SYSTEM, AND MOBILE STATION

TECHNICAL FIELD

The present invention relates to a transmission process restriction method, a mobile communication system, and a mobile station.

BACKGROUND ART

A conventional 3GPP (3rd Generation Partnership Project) mobile communication system is configured to classify mobile stations into access classes (ACs) and to notify the mobile stations of an access class targeted for calling process restriction by use of notification information.

The mobile communication system is configured to periodically shift the target of calling process restriction from one access class to another so as to implement access restriction (group restriction).

For example, consider a case where 30% access restriction is started as shown in FIG. 1. In this case, such a mobile communication system determines access classes #4 to #6 among access classes #0 to #9 as the target of calling process restriction during a first Tsec in a cell to be a target of calling process restriction. The mobile communication system then notifies mobile stations located in the cell by use of notification information.

Then, after the completion of the first Tsec, the mobile communication system determines access classes #7 to #9 among the access classes #0 to #9 as the target of calling process restriction during a second Tsec in the cell to be the target of calling process restriction. The mobile communication system then notifies mobile stations located in the cell by use of notification information.

Meanwhile, in the 3GPP mobile communication system, a network for CS (Circuit Switch) and a network for PS (Packet Switch) are separated from each other. A CS domain is used to provide communication services such as a voice communication, a Videophone, and a UDI, while a PS domain is used to provide communication services such as a packet communication.

Here, the mobile communication system is configured to notify mobile stations of restriction rate for each domain by use of notification information so as to implement access restriction (group restriction) for each domain.

However, the conventional mobile communication system which implements the above-described access restriction has a problem that notification information has to be updated periodically to notify of the start and release of the calling process restriction.

Specifically, when updating the notification information periodically, the conventional mobile communication system has a problem that paging signals for notifying the notification information have to be transmitted to mobile stations frequently, and thus a radio section is occupied by the paging signals.

Furthermore, the conventional mobile communication system has a problem of an increase in battery consumption of a mobile station since the mobile station needs to receive the paging signals and check the notification information every time the notification information is periodically updated.

Meanwhile, in a LTE (Long Term Evolution) mobile communication system, since all the communication services are provided by use of a PS domain, access restriction needs to be performed independently for each communication service.

Therefore, when access restriction is performed independently for each communication service, such a LTE mobile communication system has a problem that a very large number of restriction rates (the number of access classes×the number of communication services, at maximum) are to be notified by use of notification information.

DISCLOSURE OF THE INVENTION

Accordingly, the present invention is made in view of the above problems, and an object of the present invention is to provide a transmission process restriction method, a mobile communication system, and a mobile station which enable restricting connection request transmission processing by the mobile station while reducing the frequency of notification information changes (the frequency for the mobile station to check notification information) as well as the number of restriction rates to be notified by use of the notification information.

The first feature of the present invention relates to a transmission process restriction method for restricting connection request transmission processing by a mobile station. The method includes the steps of transmitting a notification information notifying of a restriction rate for each access class and a restriction rate for each traffic class, causing the mobile station to determine a restriction rate of the mobile station on the basis of the notification information received by the mobile station, an access class of the mobile station, and a traffic class of the mobile station, causing the mobile station to compare a random number generated by the mobile station to the restriction rate of the mobile station; and causing the mobile station to decide whether or not to block the connection request transmission processing in accordance with a result of the comparison.

The second feature of the present invention relates to a mobile communication system which is able to restrict connection request transmission processing by a mobile station, wherein a radio base station is configured to transmit a notification information notifying of a restriction rate for each access class and a restriction rate for each traffic class, and the mobile station includes a restriction rate determination unit configured to determine a restriction rate of the mobile station on the basis of the notification information received by the mobile station, an access class of the mobile station, and a traffic class of the mobile station, a comparator configured to compare a random number generated by the mobile station to the restriction rate of the mobile station, and a transmission processor configured to decide whether or not to block the connection request transmission processing in accordance with a result of the comparison.

The third feature of the present invention relates to a mobile station configured to perform connection request transmission processing. The mobile station includes a notification information receiver configured to receive a notification information notifying of a restriction rate for each access class and a restriction rate for each traffic class, an access class manager configured to manage an access class of the mobile station, a traffic class manager configured to manage a traffic class of the mobile station, a restriction rate determination unit configured to determine a restriction rate of the mobile station on the basis of the notification information received by the notification information receiver, the access class of the mobile station that the access class manager manages, and the traffic class of the mobile station that the traffic class manager manages, a random number generator configured to generate a random number, a comparator configured to compare the random number generated by the random number generator to the restriction rate of the mobile station determined by the restriction rate determination unit, and a transmission processor configured to decide whether or not to block the connection request transmission processing in accordance with a result of the comparison.

In the third feature of the present invention, a blocking period manager may be configured to acquire a blocking period from the notification information and to manage the blocking period, the blocking period indicating a period during which the connection request transmission processing is blocked, wherein when judgment is made that the random number does not exceed the restriction rate of the mobile station, the transmission processor may block the connection request transmission processing during the blocking period.

In the third feature of the present invention, the notification information receiver may acquire a restriction rate for each combination of any one of the access classes and any one of the traffic classes, from the notification information, and the restriction rate determination unit may determine the restriction rate of the mobile station by use of the restriction rate for the combination of the access class and the traffic class.

In the third feature of the present invention, the notification information receiver may acquire the restriction rate for each of the access classes and the restriction rate for each of the traffic classes, from the notification information, and the restriction rate determination unit may determine the restriction rate of the mobile station by use of the restriction rate for the access class and the restriction rate for the traffic class.

In the third feature of the present invention, the traffic class manager may manage the traffic class of the mobile station in association with at least one of communication connection destination information, communication service type information, and QoS information.

In the third feature of the present invention, the traffic class manager may manage the traffic class of the mobile station in association with at least one of the communication connection destination information, the communication service type information, and the QoS information, on the basis of association information received from an access network, during any one of Attach processing, location registration processing, and notification information reception processing.

BRIEF DESCRIPTION OF THE DRAWINGS

FIG. 2 is a functional block diagram of a mobile station according to a first embodiment of the present invention.

FIG. 3 is a diagram showing an example of restriction rates which are acquired by the mobile station according to the first embodiment of the present invention.

FIG. 4 is a diagram showing an example of restriction rates which are acquired by the mobile station according to the first embodiment of the present invention.

FIG. 5 is a diagram showing an example of restriction rates which are acquired by the mobile station according to the first embodiment of the present invention.

FIG. 6 is a diagram showing an example of access classes which are managed by the mobile station according to the first embodiment of the present invention.

FIG. 7 is a diagram showing an example of traffic classes which are managed by the mobile station according to the first embodiment of the present invention.

Figure 1:
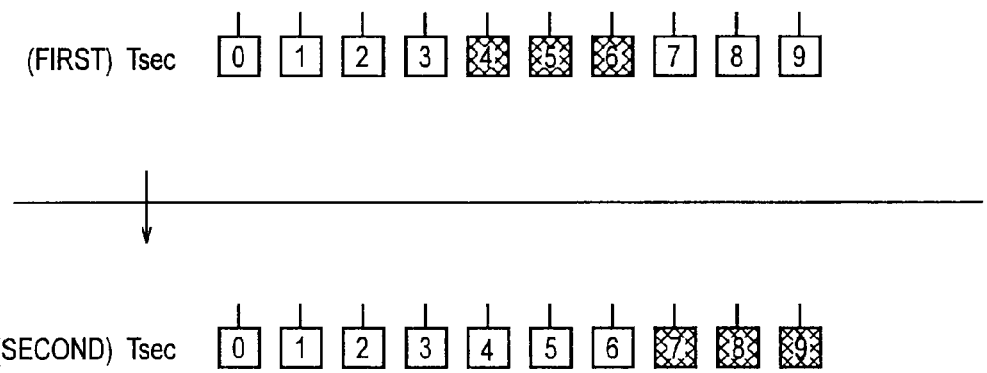
FIG. 1 is a diagram for illustrating a conventional mobile communication system.

BEST MODE FOR CARRYING OUT THE INVENTION (Configuration of Mobile Communication System According to First Embodiment of the Present Invention)

Description will be given of a configuration of a mobile communication system according to a first embodiment of the present invention referring to FIG. 2 to FIG. 8. In the present embodiment, the description will be given taking a LTE mobile communication system as an example of a mobile communication system. However, the present invention is also applicable to mobile communication systems other than the LTE mobile communication system.

The mobile communication system according to the present embodiment is configured to be able to restrict connection request transmission processing (processing to transmit a layer 3 signal, for example) by a mobile station UE.

In the present embodiment, the "connection request" includes a calling request, a response signal (reception response) made in response to a reception signal received by the mobile station UE, a location registration signal, an Attach signal, and the like.

Here, a radio base station eNB is configured to transmit notification information to mobile stations located in a certain cell, the notification information notifying of a restriction rate for each access class and a restriction rate for each traffic class.

In addition, the radio base station eNB is configured to notify the mobile stations located in the certain cell of a blocking period by use of the notification information, the blocking period indicating a period during which connection request transmission processing is blocked on the basis of the restriction rate for each access class and the restriction rate for each traffic class.

As shown in FIG. 2, the mobile station UE according to the present embodiment includes a notification information receiver 11, a restriction rate determination unit 12, an access class manager 13, a traffic class manager 14, a random number generator 15, a comparator 16, a blocking period manager 17, and a transmission processor 18.

The notification information receiver 11 is configured to receive the notification information notifying of the restriction rate for each access class and the restriction rate for each traffic class.

Specifically, the notification information receiver 11 may be configured to acquire a restriction rate for each combination of an access class and a traffic class, among the received notification information.

FIG. 3 shows an example in which the notification information receiver 11 acquires; a restriction rate "80%" for a combination of an access class "AC-A" and a traffic class "TC-A;" a restriction rate "80%" for a combination of the access class "AC-A" and a traffic class "TC-B;" a restriction rate "0%" for a combination of the access class "AC-A" and a traffic class "TC-C;" a restriction rate "0%" for a combination of an access class "AC-B" and the traffic class "TC-A;" a restriction rate "0%" for a combination of the access class "AC-B" and the traffic class "TC-B;" a restriction rate "0%" for a combination of the access class "AC-B" and the traffic class "TC-C;" a restriction rate "0%" for a combination of an access class "AC-C" and the traffic class "TC-A;" a restriction rate "0%" for a combination of the access class "AC-C" and the traffic class "TC-B;" and a restriction rate "0%" for a combination of the access class "AC-C" and the traffic class "TC-C."

In addition, FIG. 4 shows an example in which the notification information receiver 11 acquires: a restriction rate "80%" for a combination of an access class "AC-A" and a traffic class "TC-A;" a restriction rate "80%" for a combination of the access class "AC-A" and a traffic class "TC-B;" a restriction rate "0%" for a combination of the access class "AC-A" and a traffic class "TC-C;" a restriction rate "0%" for a combination of an access class "AC-B" and the traffic classes "TC-A to TC-C;" and a restriction rate "0%" for a combination of an access class "AC-C" and the traffic classes "TC-A to TC-C."

Alternatively, the notification information receiver 11 may be configured to acquire a restriction rate for each access class and a restriction rate for each traffic class, among the received notification information.

FIG. 5(a) shows an example in which the notification information receiver 11 acquires a restriction rate "80%" for an access class "AC-A," a restriction rate "0%" for an access class "AC-B," and a restriction rate "0%" for an access class "AC-C."

In addition, FIG. 5(b) shows an example in which the notification information receiver 11 acquires a restriction rate "80%" for a traffic class "TC-A," a restriction rate "30%" for a traffic class "TC-B," and a restriction rate "30%" for a traffic class "TC-C."

The access class manager 13 is configured to manage an access class for the mobile station UE.

In the present embodiment, 16 types of access classes "0" to "15" are assumed as shown in FIG. 6. The present embodiment is configured to impose the restriction on the connection request transmission processing (access restriction), on mobile stations UE in the access classes "0" to "9."

The traffic class manager 14 is configured to manage a traffic class of the mobile station UE.

Specifically, the traffic class manager 14 is configured to manage the traffic class of the mobile station UE in association with at least one of the communication connection destination information, the communication service type information, and the QoS (Quality Of Service) information.

For example, as shown in FIG. 7(a), the traffic class manager 14 may be configured to manage the communication connection destination information and the traffic class of the mobile station UE in association with each other, the communication connection destination information indicating a connection destination requested by the mobile station UE in connection request transmission processing.

Consider a case where the traffic class manager 14 is configured in the above-described manner. If the communication connection destination information indicates a "connection destination A" (i.e., if a destination to which the connection request is transmitted is a "connection destination A"), the traffic class manager 14 outputs that the traffic class of the mobile station UE is "TC-A." If the communication connection destination information indicates a "connection destination B" (i.e., if a destination to which the connection request is transmitted is a "connection destination B"), the traffic class manager 14 outputs that the traffic class of the mobile station UE is "TC-A." If the communication connection destination information indicates a "connection destination C" (i.e., if a destination to which the connection request is transmitted is a "connection destination C"), the traffic class manager 14 outputs that the traffic class of the mobile station UE is "TC-B." If the communication connection destination information indicates "connection destinations except the above" (i.e., if a destination to which the connection request is transmitted falls within "connection destinations except the above"), the traffic class manager 14 outputs that the traffic class of the mobile station UE is "TC-C."

Alternatively, as shown in FIG. 7(b), the traffic class manager 14 may be configured to manage the communication service type information and the traffic class of the mobile station UE in association with each other, the communication service type information indicating a type of a communication service (a communication service to be performed in a PS domain) to be started by connection request transmission processing by the mobile station UE (a calling request or a reception response, for example).

Consider a case where the traffic class manager 14 is configured in the above-described manner. If the communication service type information indicates a "voice communication" (i.e., if a communication service to be started by the connection request transmission processing is a "voice communication"), the traffic class manager 14 outputs that the traffic class of the mobile station UE is "TC-A." If the communication service type information indicates a "packet communication" (i.e., if a communication service to be started by the connection request transmission processing is a "packet communication"), the traffic class manager 14 outputs that the traffic class of the mobile station UE is "TC-B." If the communication service type information indicates a "Videophone" (i.e., if a communication service to be started by the connection request transmission processing is a "Videophone"), the traffic class manager 14 outputs that the traffic class of the mobile station UE is "TC-A." If the communication service type information indicates "others" (i.e., if a communication service to be started by the connection request transmission processing falls within "others"), the traffic class manager 14 outputs that the traffic class of the mobile station UE is "TC-C."

Alternatively, as shown in FIG. 7(c), the traffic class manager 14 may be configured to manage the QoS information and the traffic class of the mobile station UE in association with each other, the QoS information indicating QoS information requested for a communication service (a communication service to be performed in a PS domain) to be started by connection request transmission processing by the mobile station UE.

Consider a case where the traffic class manager 14 is configured in the above-described manner. If the QoS information indicates "Conversational" (i.e., if QoS information corresponding to a communication service to be started by the connection request transmission processing is classified into "Conversational"), the traffic class manager 14 outputs that the traffic class of the mobile station UE is "TC-A." If the QoS information indicates "Streaming" (i.e., if QoS information corresponding to a communication service to be started by the connection request transmission processing is classified into "Streaming"), the traffic class manager 14 outputs that the traffic class of the mobile station UE is "TC-B." If the QoS information indicates "Interactive" (i.e., if QoS information corresponding to a communication service to be started by the connection request transmission processing is classified into "Interactive"), the traffic class manager 14 outputs that the traffic class of the mobile station UE is "TC-C." If the QoS information indicates "Back Ground" (i.e., if QoS information corresponding to a communication service to be started by the connection request transmission processing is classified into "Back Ground"), the traffic class manager 14 outputs that the traffic class of the mobile station UE is "TC-C."

Note that the traffic class manager 14 may be configured to manage a combination of at least two of the communication connection destination information, the communication service type information, and the QoS information, in association with the traffic class of the mobile station UE.

Alternatively, the traffic class manager 14 may be configured to manage at least one of the communication connection destination information, the communication service type information, and the QoS information, in association with the traffic class of the mobile station, on the basis of association information which is received from an access network at the time of either Attach processing, location registration processing, or reception processing of notification information.

The restriction rate determination unit 12 is configured to determine the restriction rate of the mobile station UE on the basis of the notification information received by the notification information receiver 11, the access class of the mobile station UE managed by the access class manager 13, and the traffic class of the mobile station UE managed by the traffic class manager 14.

The restriction rate determination unit 12 may be configured to determine the restriction rate of the mobile station UE by use of the restriction rate (see FIG. 3 or FIG. 4) for each combination of an access class and a traffic class, the restriction rate obtained by the notification information receiver 11.

For example, the restriction rate determination unit 12 determines the restriction rate of the mobile station UE as "80%" when acquiring the restriction rates shown in FIG. 3 or FIG. 4 from the notification information receiver 11, acquiring "AC-A" as the access class of the mobile station UE from the access class manager 13, and acquiring "TC-A" as the traffic class of the mobile station UE from the traffic class manager 14.

The restriction rate determination unit 12 may be configured to determine the restriction rate of the mobile station by use of the restriction rate for each access class and the restriction rate for each traffic class which are acquired by the notification information receiver 11 (see FIG. 5(*a*) and FIG. 5(*b*)).

For example, when the restriction rate determination unit 12 acquires the restriction rate for each access class shown in FIG. 5(*a*) and the restriction rate for each traffic class shown in FIG. 5(*b*) from the notification information receiver 11, acquires "AC-A" as the access class of the mobile station UE from the access class manager 13, and acquires "TC-A" as the traffic class of the mobile station UE from the traffic class manager 14, the restriction rate determination unit 12 may determine the restriction rate of the mobile station UE as "64%" by multiplying the restriction rate "80%" corresponding to the access class of the mobile station UE and the restriction rate "80%" corresponding to the traffic class of the mobile station UE.

Alternatively, when the restriction rate determination unit 12 acquires the restriction rate for each access class shown in FIG. 5(*a*) and the restriction rate for each traffic class shown in FIG. 5(*b*) from the notification information receiver 11, acquires "AC-A" as the access class of the mobile station UE from the access class manager 13, and acquires "TC-A" as the traffic class of the mobile station UE from the traffic class manager 14, the restriction rate determination unit 12 may determine the restriction rate of the mobile station UE by the following Expressions (1) and (2).

transmittable rate $z$ (%) for mobile station $UE$=(100(%)−restriction rate 80(%) for access class of mobile station $UE$)×(100(%)−restriction rate 80(%) for traffic class of mobile station $UE$)=4 (%)   Expression (1)

restriction rate for mobile station $UE$=100(%)−$z$(%) =36(%)   Expression (2)

The random number generator 15 is configured to generate a random number in any appropriate method.

The comparator 16 is configured to compare the random number generated by the random number generator 15 with the restriction rate for the mobile station UE determined by the restriction rate determination unit 12.

The blocking period manager 17 is configured to manage a blocking period indicating a period during which connection request transmission processing by a mobile station UE is blocked.

Here, the blocking period manager 17 may be configured to manage a blocking period set in advance, or may be configured to acquire a blocking period from notification information and manage the blocking period.

Further, the blocking period manager 17 may manage the blocking period for each access class, may manage the blocking period for each traffic class, or may manage the blocking period for each combination of an access class and a traffic class.

The transmission processor 18 is configured to perform connection request transmission processing.

Specifically, the transmission processor 18 is configured to decide whether or not to block the connection request transmission processing on the basis of a result of comparison made by the comparator 16.

Figure 8:
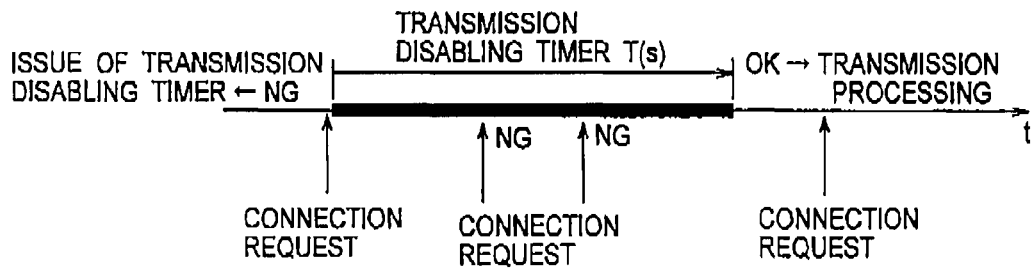
FIG. 8 is a diagram for illustrating connection request transmission processing performed by the mobile station according to the first embodiment of the present invention.

For example, as shown in FIG. 8, the transmission processor 18 is configured to activate a transmission disabling timer T(s) when judgment is made that the random number generated by the random number generator 15 does not exceed the restriction rate for the mobile station UE determined by the restriction rate determination unit 12, the transmission disabling timer T(s) managing the blocking period managed by the blocking period manager 17. The transmission processor 18 is also configured to block transmission processing for a newly generated connection request during the activation of the transmission disabling timer T(s) (during the blocking period).

Here, the transmission processor 18 is able to change the duration in which the connection request transmission processing is blocked, in accordance with a communication service to be started by the connection request transmission processing, and the blocking period.

(Operation of Mobile Communication System According to First Embodiment of the Present Invention)

Figure 9:
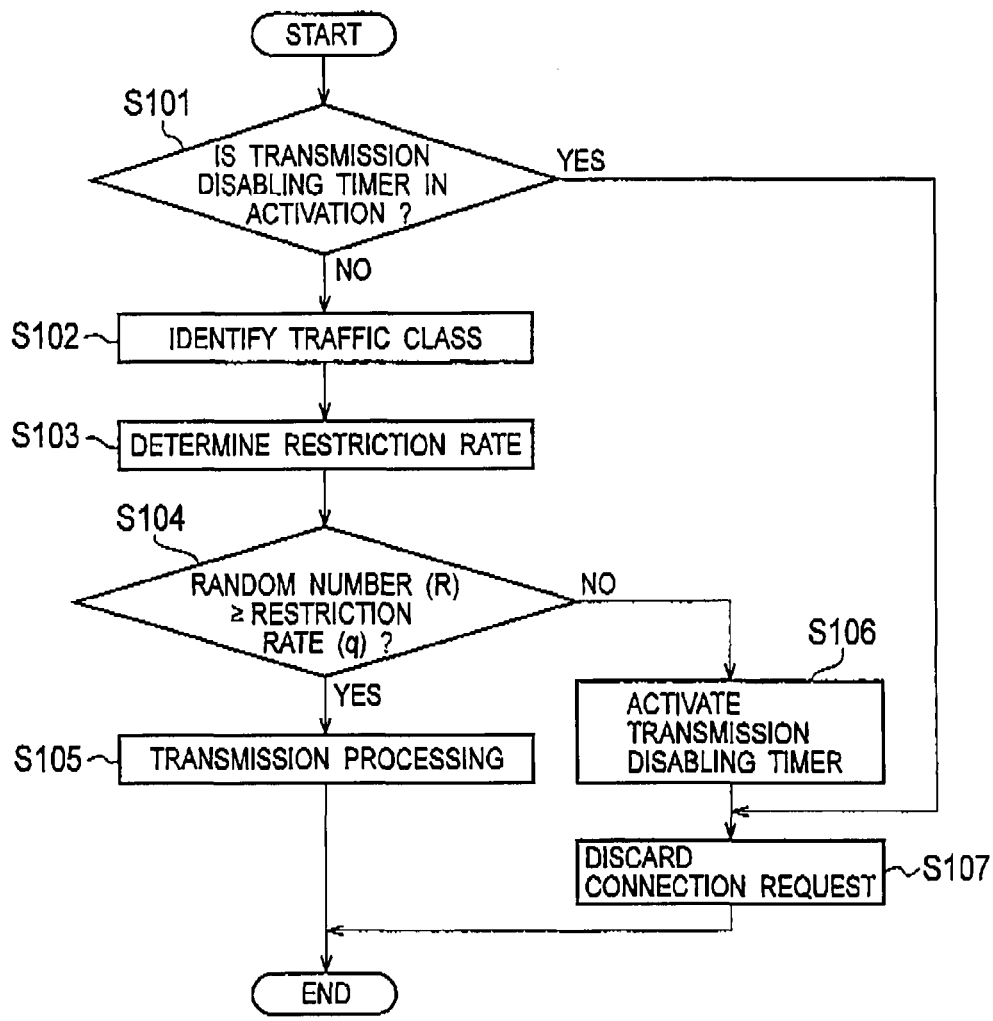
FIG. 9 is a flowchart showing an operation of the mobile station according to the first embodiment of the present invention.

Referring to FIG. 9, description will be given of an operation of the mobile communication system according to the first embodiment of the present invention (specifically, an operation of the mobile station UE)

As shown in FIG. 9, in accordance with an operation by a user (an operation on a button, for example), a mobile station UE decides in Step S101 whether or not the transmission disabling timer T(s) is in activation or not, i.e., whether or not a mobile station UE is in the blocking period.

When it is decided that the transmission disabling timer T(s) is in activation, the present operation moves on to Step S107, while when it is decided that the transmission disabling timer T(s) is not in activation, the present operation moves on to Step S102.

In Step S102, the mobile station UE specifies the traffic class of the mobile station UE in accordance with the communication service (communication connection destination information, communication service type information, or QoS information) to be started with the above-mentioned user operation.

In Step S103, the mobile station UE determines a restriction rate (q) of the mobile station UE on the basis of the received notification information, the access class of the mobile station UE, and the specified traffic class of the mobile station UE.

In Step S104, the mobile station UE decides whether a generated random number (R) is not less than the restriction rate (q) of the mobile station UE.

When it is decided that the generated random number (R) is equal to or more than the restriction rate (q) of the mobile station UE, the mobile station UE performs, in Step S105, connection request transmission processing to start the communication service in response to the user's operation.

On the other hand, when it is decided that the generated random number (R) does not exceed the restriction rate (q) of the mobile station UE, the mobile station UE activates the transmission disabling timer T(s) in Step S106, and blocks the connection request transmission processing to start the communication service in Step S107 (in a case where the connection request has been generated, the mobile station UE discards the connection request).

(Advantages and Effects of Mobile Communication System According to First Embodiment of the Present Invention)

The mobile communication system according to the present embodiment enables restricting connection request transmission processing appropriately only by transmitting at certain timing, notification information which is used to notify of the restriction rate for each access class and the restriction rate for each traffic class. Thus, the mobile communication system according to the present embodiment can solve the problem, such as the one the conventional mobile communication system has, that notification information has to be updated periodically to notify of the start and release of restriction on connection request transmission processing.

In addition, the mobile communication system according to the present embodiment is configured in that the restriction rate for each access class and the restriction rate for each traffic class are notified by use of a notification information. For this reason, the mobile communication system according to the present embodiment is able to solve the problem, such as the one the conventional mobile communication system has, that the number of restriction rates to be notified by use of notification information is excessively large (the number of access classes×the number of communication services, at maximum), because access restriction is performed independently on each communication service.

In addition, with the mobile communication system according to the present embodiment, the restriction rate for each access class and the restriction rate for each traffic class can be notified separately in the forms shown in FIG. 5(a) and FIG. 5(b). Thus, the length of the notification information can be reduced.

(Modification)

In a modification of the present embodiment, a radio base station eNB is configured to transmit notification information which notifies restriction information on each access class and restriction information on each traffic class, instead of notifying the restriction rate for each access class and the restriction rate for each traffic class.

In addition, a radio base station eNB is configured to notify of a blocking period by use of the notification information, as well as the restriction information on each access class and the restriction information on each traffic class, the blocking period indicating a period during which connection request transmission processing by the mobile station UE is blocked.

Consequently, the mobile station UE is configured in that a transmission processor 18 decides whether or not to block the connection request transmission processing on the basis of the restriction information on each access class and the restriction information on each traffic class which are included in the notification information received by a notification information receiver 11.

Specifically, when the notification information notifies of restriction information indicating that the connection request transmission processing is blocked for a combination of the access class of the mobile station UE and the traffic class of the mobile station UE, the transmission processor 18 decides to block the connection request transmission processing.

The transmission processor 18 is configured to block transmission processing for a newly generated connection request during the received blocking period, when having decided to block the connection request transmission processing as in the above case.

Note that the operation of the mobile station UE and of the radio base station eNB may be implemented by hardware, may be implemented by a software module that is executed by a processor, or may be implemented by combination of both.

The software module may be provided in any form of storage media including a RAM (Random Access Memory), a flash memory, a ROM (Read Only Memory), an EPROM (Erasable Programmable ROM), an EEPROM (Electronically Erasable and Programmable ROM), a register, a hard disc, a removable disc, and a CD-ROM.

Such a storage medium is connected to the processor so as to allow the processor to read or write information from or to the storage medium. Alternatively, the storage medium may be integrated in a processor. Furthermore, the storage medium and the processor may be provided in ASIC. The ASIC may be provided in the mobile station UE and the radio base station eNB. Instead, the storage medium and the processor may be provided in the mobile station UE and the radio base station eNB as discrete components.

As has been described so far, the present invention has been described in detail using the embodiment. However, it is apparent for those skilled in the art that the present invention is not limited to the embodiment described herein. The present invention can be implemented as modifications and alternative embodiments without departing from the gist and scope of the present invention defined by the description of the scope of claims. Accordingly, the description herein is intended only for an exemplary purpose and has no intention to limit the present invention.

Note that the entire content of Japanese Patent Application No. 2007-276776 (filed on Oct. 24, 2007) is incorporated herein by reference.

INDUSTRIAL APPLICABILITY

As has been described, the present invention is able to provide a transmission process restriction method, a mobile communication system, and a mobile station which enable restricting connection request transmission processing by the mobile station while reducing the frequency of notification information changes (the frequency for the mobile station to check notification information) and the number of restriction rates to be notified by use of the notification information.

The invention claimed is:

1. A transmission process restriction method for restricting connection request transmission processing by a mobile station, the method comprising the steps of:
   transmitting a notification information notifying of a restriction rate for each access class and a restriction rate for each traffic class;
   acquiring a restriction rate for each combination of any one of the access classes and any one of the traffic classes, from the notification information;

causing the mobile station to determine a restriction rate of the mobile station on the basis of the notification information received by the mobile station, an access class of the mobile station, and a traffic class of the mobile station, by use of the restriction rate for the combination of the access class and the traffic class;

causing the mobile station to compare a random number generated by the mobile station to the restriction rate of the mobile station; and causing the mobile station to decide whether or not to block the connection request transmission processing in accordance with a result of the comparison.

2. A mobile communication system which is able to restrict connection request transmission processing by a mobile station, wherein a radio base station is configured to transmit a notification information notifying of a restriction rate for each access class and a restriction rate for each traffic class, and the mobile station includes:

a notification information receiver configured to acquire a restriction rate for each combination of any one of the access classes and any one of the traffic classes, from the notification information;

a restriction rate determination unit configured to determine a restriction rate of the mobile station on the basis of the notification information received by the mobile station, an access class of the mobile station, and a traffic class of the mobile station, by use of the restriction rate for the combination of the access class and the traffic class;

a comparator configured to compare a random number generated by the mobile station to the restriction rate of the mobile station; and a transmission processor configured to decide whether or not to block the connection request transmission processing in accordance with a result of the comparison.

3. A mobile station configured to perform connection request transmission processing, the mobile station comprising:

a notification information receiver configured to receive a notification information notifying of a restriction rate for each access class and a restriction rate for each traffic class, and to acquire a restriction rate for each combination of any one of the access classes and any one of the traffic classes, from the notification information;

an access class manager configured to manage an access class of the mobile station;

a traffic class manager configured to manage a traffic class of the mobile station;

a restriction rate determination unit configured to determine a restriction rate of the mobile station on the basis of the notification information received by the notification information receiver, the access class of the mobile station that the access class manager manages, and the traffic class of the mobile station that the traffic class manager manages, by use of the restriction rate for the combination of the access class and the traffic class;

a random number generator configured to generate a random number;

a comparator configured to compare the random number generated by the random number generator to the restriction rate of the mobile station determined by the restriction rate determination unit; and a transmission processor configured to decide whether or not to block the connection request transmission processing in accordance with a result of the comparison.

4. The mobile station according to claim 3, comprising a blocking period manager configured to acquire a blocking period from the notification information and to manage the blocking period, the blocking period indicating a period during which the connection request transmission processing is blocked, wherein when judgment is made that the random number odes not exceed the restriction rate of the mobile station, the transmission processor blocks the connection request transmission processing during the blocking period.

5. The mobile station according to claim 3, wherein the notification information receiver acquires the restriction rate for each of the access classes and the restriction rate for each of the traffic classes, from the notification information, and the restriction rate determination unit determines the restriction rate of the mobile station by use of the restriction rate for the access class and the restriction rate for the traffic class.

6. The mobile station according to claim 3, wherein the traffic class manager manages the traffic class of the mobile station in association with at least one of communication connection destination information, communication service type information, and QoS information.

7. The mobile station according to claim 6, wherein the traffic class manager manages the traffic class of the mobile station in association with at least one of the communication connection destination information, the communication service type information, and the QoS information, on the basis of association information received from an access network, during any one of Attach processing, location registration processing, and notification information reception processing.

* * * * *